United States Patent
Ho et al.

(10) Patent No.: US 8,587,933 B2
(45) Date of Patent: Nov. 19, 2013

(54) HANDHELD ELECTRONIC DEVICE

(75) Inventors: Yi-Bin Ho, Taoyuan County (TW); Meng-Sheng Chiang, Taoyuan County (TW); Chih-Shan Yeh, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 374 days.

(21) Appl. No.: 13/014,686

(22) Filed: Jan. 26, 2011

(65) Prior Publication Data
US 2012/0069504 A1 Mar. 22, 2012

(30) Foreign Application Priority Data
Sep. 17, 2010 (TW) .............................. 99131622 A (51) Int. Cl.
*H05K 5/00* (2006.01)

(52) U.S. Cl.
USPC ............ 361/679.01; 361/679.02; 361/679.08; 361/679.09; 345/168; 345/169

(58) Field of Classification Search
USPC ............. 361/679.01, 670.02, 679.08, 679.09, 361/679.11, 679.21, 679.32, 679.39; 345/168, 169; 455/575.1, 575.3, 575.4
See application file for complete search history.

(56) References Cited

U.S. PATENT DOCUMENTS

| | | | |
|---|---|---|---|
| 6,768,635 B2 * | 7/2004 | Lai et al. | 361/679.11 |
| 7,221,560 B2 * | 5/2007 | Varela | 361/679.08 |
| 7,920,372 B2 * | 4/2011 | Tompkin | 361/679.01 |
| 8,244,319 B2 * | 8/2012 | Paschke et al. | 455/575.4 |
| 8,325,912 B2 * | 12/2012 | Hu et al. | 379/433.12 |
| 2008/0188273 A1 | 8/2008 | You | |
| 2010/0079938 A1 | 4/2010 | Paschke et al. | |

FOREIGN PATENT DOCUMENTS

| | | |
|---|---|---|
| EP | 1324571 | 7/2003 |
| EP | 2045873 | 4/2009 |
| EP | 2323352 | 5/2011 |
| TW | I280772 | 5/2007 |

OTHER PUBLICATIONS

"Office Action of European Counterpart Application", issued on Jan. 13, 2012, p. 1-p. 7.
"Search Report of Europe Counterpart Application", issued on Nov. 21, 2011, p. 1-p. 3.

* cited by examiner

*Primary Examiner* — Jayprakash N Gandhi
*Assistant Examiner* — Hung Dang
(74) *Attorney, Agent, or Firm* — Jianq Chyun IP Office (57) ABSTRACT

A handheld electronic device including a first body, a second body, a stand, and a transmission module is provided. The second body is slidably connected to the first body. The stand is pivoted to the first body. The transmission module connects between the first body and the second body. When the second body slides relative to the first body, the second body drives the transmission module to move the stand so that the stand is opened and closed relative to the first body.

11 Claims, 7 Drawing Sheets

HANDHELD ELECTRONIC DEVICE

CROSS-REFERENCE TO RELATED APPLICATION

This application claims the priority benefit of Taiwan application serial No. 99131622, filed on Sep. 17, 2010. The entirety of the above-mentioned patent application is hereby incorporated by reference herein and made a part of this specification.

BACKGROUND

1. Field of the Invention

The application relates to a handheld electronic device. Particularly, the application relates to a handheld electronic device having a stand integrated with a body thereof.

2. Description of Related Art

A handheld electronic device refers to an electronic device capable being held and operated by a user, for example, a mobile phone, a multimedia player, a personal digital assistant (PDA), a handheld computer, a handheld game machine and a handheld satellite navigator, etc. Such type of the electronic device generally has a small size and a light weight to facilitate being carried by the user.

In order to stand the handheld electronic device on a surface to facilitate the user using the handheld electronic device, i.e. viewing a content displayed on a display screen of the handheld electronic device or hearing a sound sent by the handheld electronic device without holding it, a supporting means, for example, a cradle or a stand is additionally fabricated according to a conventional technique, so that the handheld electronic device can be supported by the supporting means and stood on the surface.

However, the method of erecting the handheld electronic device through the additional supporting means decreases a utilization convenience of the handheld electronic device.

SUMMARY OF THE INVENTION

The application is directed to a handheld electronic device having a stand integrated with a body thereof.

The application provides a handheld electronic device including a first body, a second body, a stand, and a transmission module. The second body is slidably connected to the first body. The stand is pivoted to the first body. The transmission module is connected between the first body and the second body. When the second body slides relative to the first body, the second body drives the transmission module to move the stand, so that the stand is opened and closed relative to the first body.

According to the above description, in the application, the stand is pivoted to the first body, and the transmission module is used to drive the stand, so that the stand is opened and closed relative to the first body. In this way, the handheld electronic device can be stood on the surface, so that a utilization convenience of the handheld electronic device is increased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
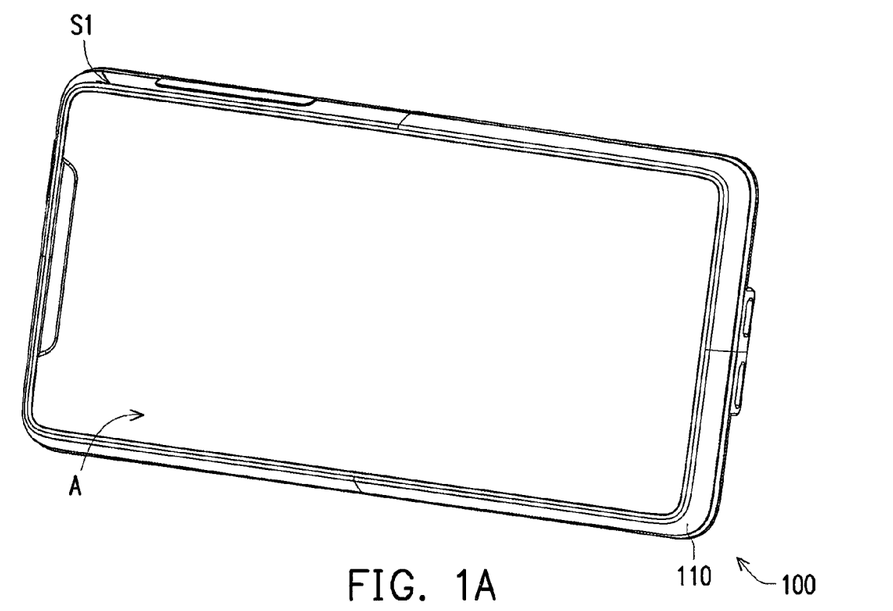
FIG. 1A and FIG. 1B are schematic diagrams respectively illustrating a handheld electronic device when bodies thereof are in a close state according to an embodiment of the invention.
Figure 1B:
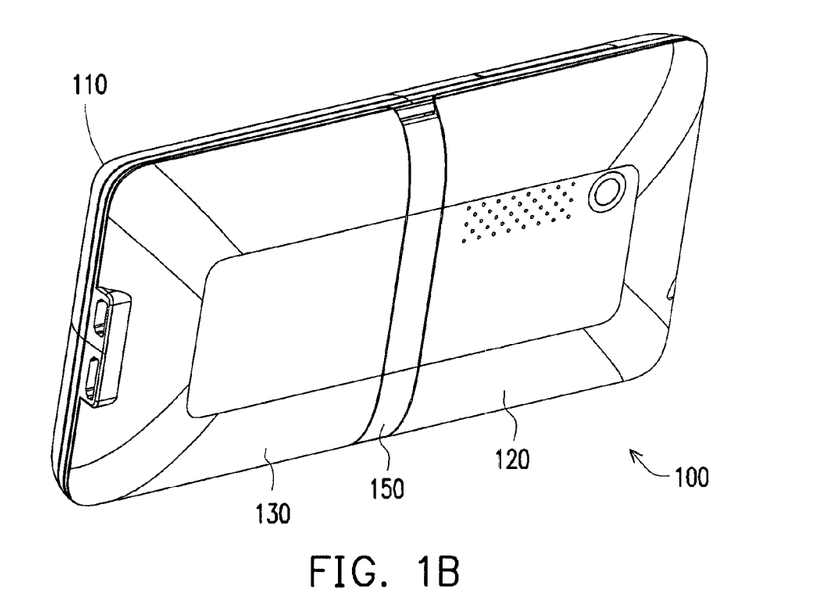
Figure 2A:
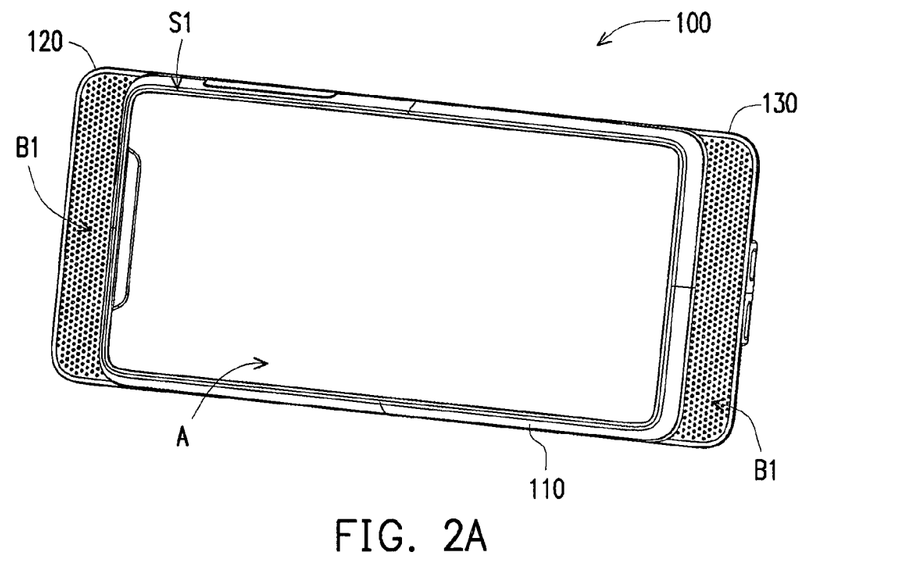
FIG. 2A and FIG. 2B are schematic diagrams respectively illustrating the handheld electronic device of FIG. 1A when bodies thereof are in a spread state according to an embodiment of the invention.
Figure 2B:
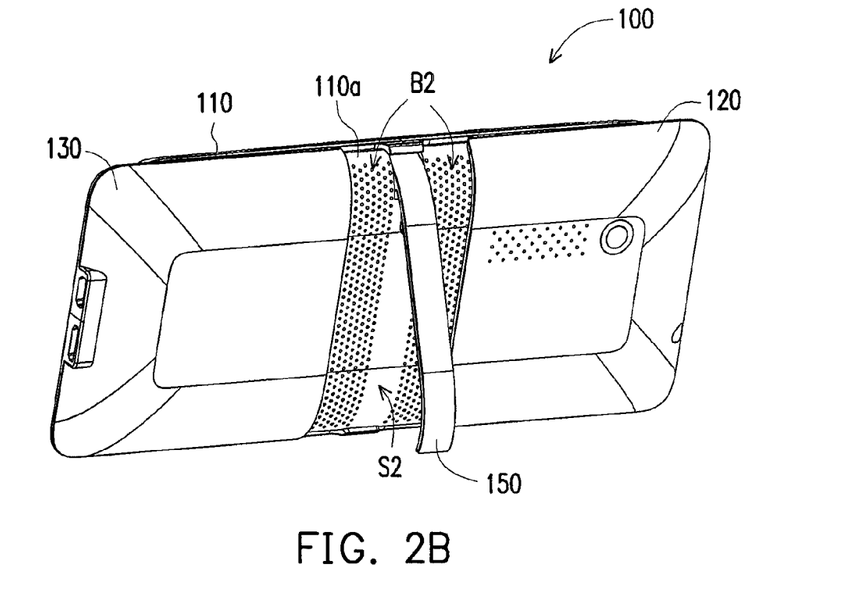

FIG. 1A and FIG. 1B are schematic diagrams respectively illustrating a handheld electronic device when bodies thereof are in a close state according to an embodiment of the invention. FIG. 2A and FIG. 2B are schematic diagrams respectively illustrating the handheld electronic device of FIG. 1A when bodies thereof are in a spread state according to an embodiment of the invention. Here, the close state and the spread state of bodies of the handheld electronic device are clearly presented in different viewing angles.

Referring to FIG. 1A to FIG. 2B, in the present embodiment, the handheld electronic device 100 is, for example, a mobile audio/video device or a smart phone. The handheld electronic device 100 includes a first body 110, a second body 120 and a third body 130. The second body 120 and the third body 130 are all slidably connected to the first body 110. When the second body 120 slides relative to the first body 110, the third body 130 also slides relative to the first body 110 and the second body 120 in an opposite direction, so that the second body 120 and the third body 130 are moved close to or away from each other relative to the first body 110. In this way, the second body 120 and the third body 130 are switched between the spread state (FIG. 2A and FIG. 2B) and the close state (FIG. 1A and FIG. 1B) relative to the first body 110.

Figure 3:
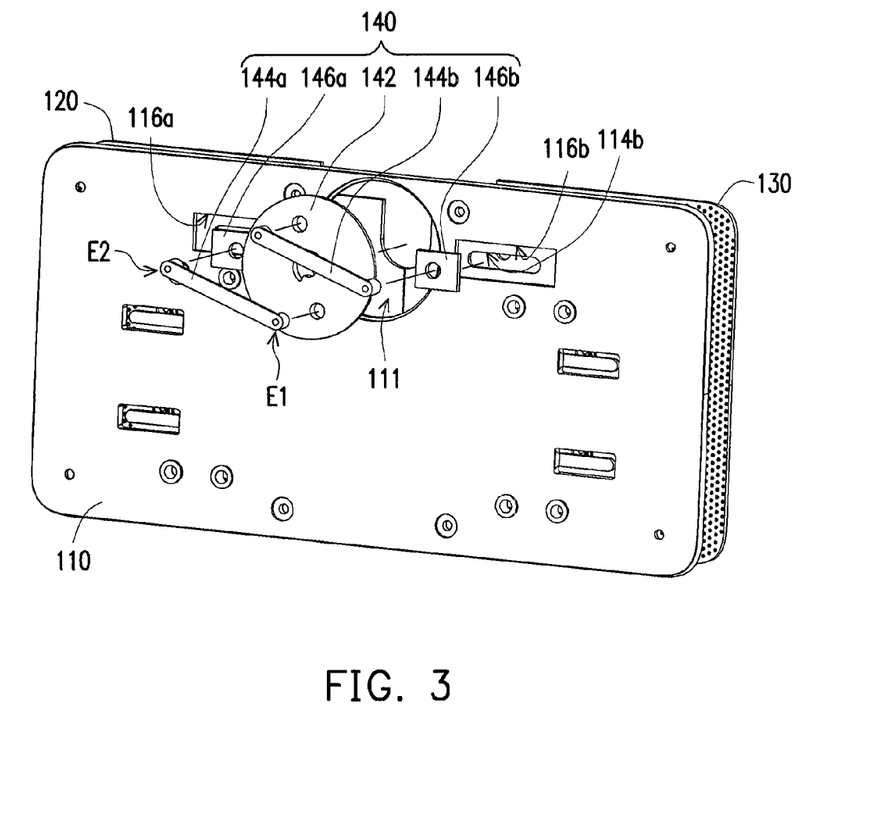
FIG. 3 and FIG. 4 are exploded views of a part of members in the handheld electronic device of FIG. 1A.
Figure 4:
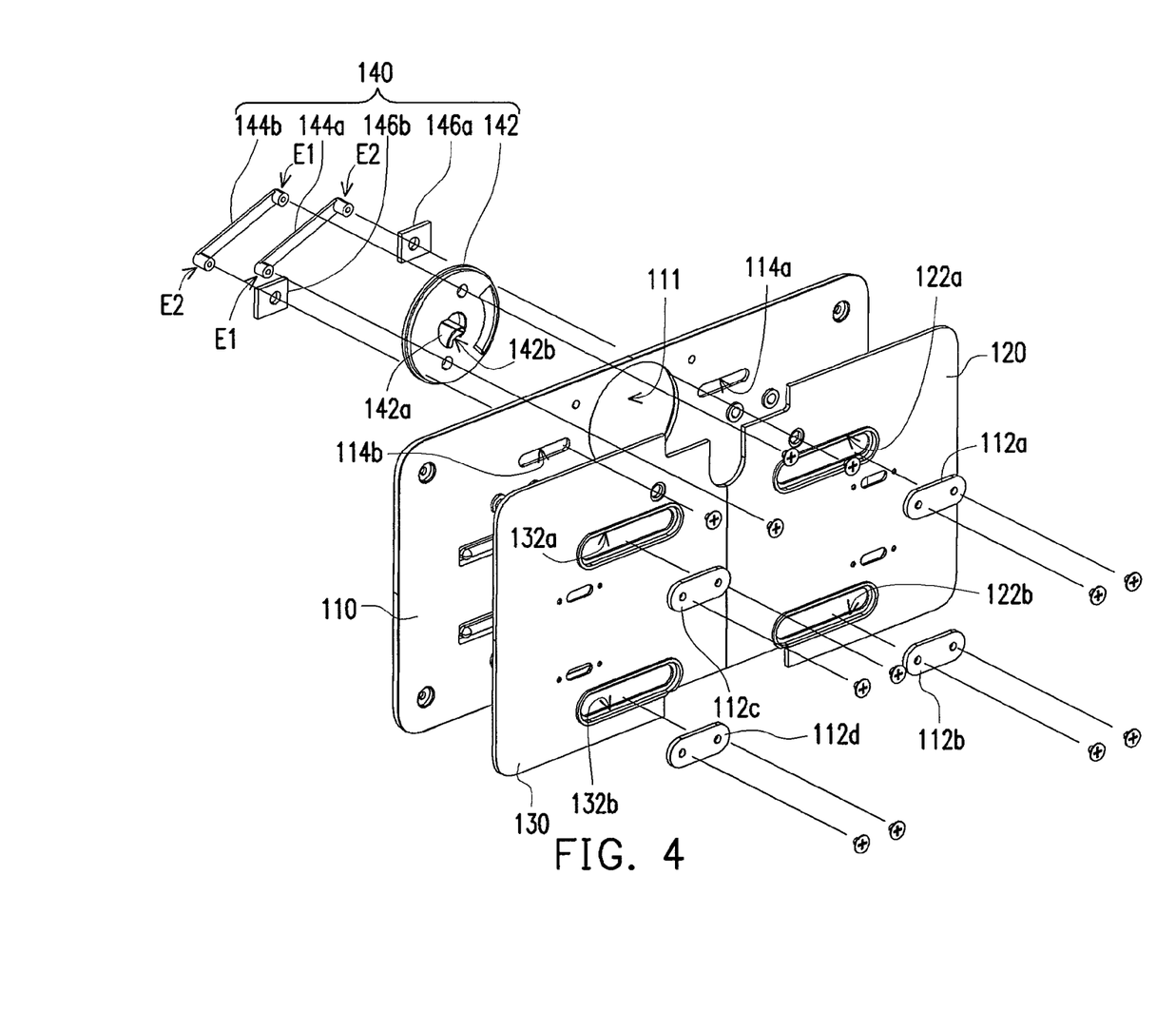

FIG. 3 and FIG. 4 are exploded views of a part of members in the handheld electronic device of FIG. 1A. Here, a part of the first body 110, the second body 120 and the third body 130 is omitted, and related members of the handheld electronic device 100 are clearly presented in different viewing angles.

Referring to FIG. 2A, FIG. 2B, FIG. 3 and FIG. 4, in the present embodiment, the handheld electronic device 100 further includes a transmission module 140 connected between the first body 110, the second body 120 and the third body 130, and a stand 150 pivoted to the first body 110. When the second body 120 (or the third body 130) slides relative to the first body 110, the second body 120 (or the third body 130) drives the transmission module 140 to move the stand 150, so that the stand 150 is opened and closed relative to the first body 110, as that shown in FIG. 1B and FIG. 2B.

In detail, when the second body 120 and the third body 130 are spread relative to the first body 110, the second body 120 and the third body 130 drive the transmission module 140 to move the stand 150, so that the stand 150 is spread from the first body 110, as that shown in FIG. 2B. Conversely, when the second body 120 and the third body 130 are closed relative to the first body 110, the second body 120 and the third body 130 drive the transmission module 140 to move the stand 150, so that the stand 150 is closed to the first body 110, as that shown in FIG. 2A.

Figure 5:
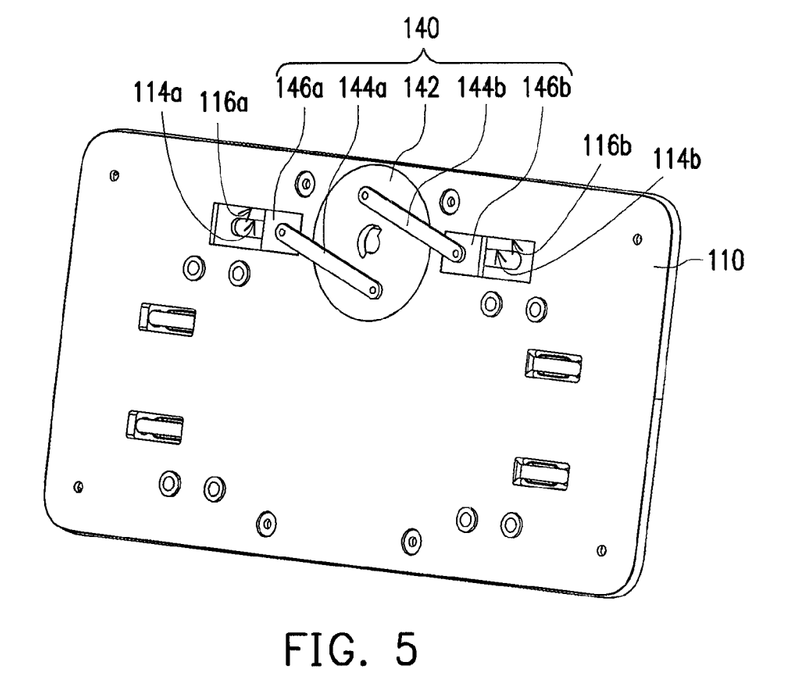
FIG. 5 is a schematic diagram illustrating a part of the members of FIG. 3 after assembly.

FIG. 5 is a schematic diagram illustrating a part of the members of FIG. 3 after assembly. Referring to FIG. 3 to FIG. 5, in the present embodiment, in order to slidably connect the second body 120 and the third body 130 to the first body 110, the second body 120 has a plurality of guiding slots 122a and 122b, and the third body 130 has a plurality of guiding slots 132a and 132b, while the first body 110 has a plurality of guiding members 112a, 112b, 112c and 112d fastened thereon, wherein the guiding members 112a, 112b, 112c and 112d are respectively coupled to the guiding slots 122a, 122b, 132a and 132b, so that the second body 120 and the third body 130 can slide relative to the first body 110. However, the structure used for slidably connecting the second body 120 and the third body 130 to the first body 110 is not limited to that disclosed by the present embodiment.

Referring to FIG. 3 to FIG. 5, in order to drive the transmission module 140 by sliding the second body 120 or the third body 130 relative to the first body 110, the transmission module 140 includes a turntable 142 and two connection rods 144a and 144b. The turntable 142 is pivoted to the first body 110. In the present embodiment, the turntable 142 is disposed in a circular hole 111 of the first body 110 based on its circular profile, so as to be pivoted to the first body 110. The connection rod 144a has a first end E1 and a second end E2, wherein the first end E1 is pivoted to the turntable 142, and the second end E2 passes through a sliding slot 114a of the first body 110 and is pivoted to the second body 120. Similarly, a structure of the connection rod 144b is the same to that of the connection rod 144a, and a connection relation of the connection rod 144b is also the same to the connection relation between the connection rod 144a and the turntable 142 and the second body 120, which are not repeated herein.

In this way, when the second body 120 is pushed to slide relative to the first body 110, the second body 120 can drive the second end E2 of the connection rod 144a to slide in the sliding slot 114a, and simultaneously drive the first end E1 of the connection rod 144a to move the turntable 142, so that the turntable 142 is pivotally rotated relative to the first body 110. Meanwhile, the turntable 142 also drives the connection rod 144b, so as to drive the third body 130 to slide relative to the first body 110. Similarly, when the third body 130 is pushed to slide relative to the first body 110, the third body 130 can also simultaneously drive the second body 120 to slide relative to the first body 110 through the transmission module 140.

Moreover, in the present embodiment, the first body 110 has two position-limit slots 116a and 116b respectively connected to the sliding slots 114a and 114b, and the transmission module 140 further includes two position-limit members 146a and 146b, wherein the position-limit member 146a and 146b are movably disposed in the position-limit slots 116a and 116b. Here, only the position-limit member 146a and the position-limit slot 116a are taken as an example for description. In the present embodiment, the second end E2 of the connection rod 144a passes through the position-limit member 146a and is pivoted to the second body 120. In this way, a fixed sliding path is maintained when the second end E2 of the connection rod 144a slides in the sliding slot 114a, so as to avoid swaying and unstable sliding when the second body 120 slides relative to the first body 110. Moreover, regarding the second end E2 of the connection rod 144b and the sliding slot 114b, the position-limit member 146b and the position-limit slot 116b have the same effect.

Figure 6:
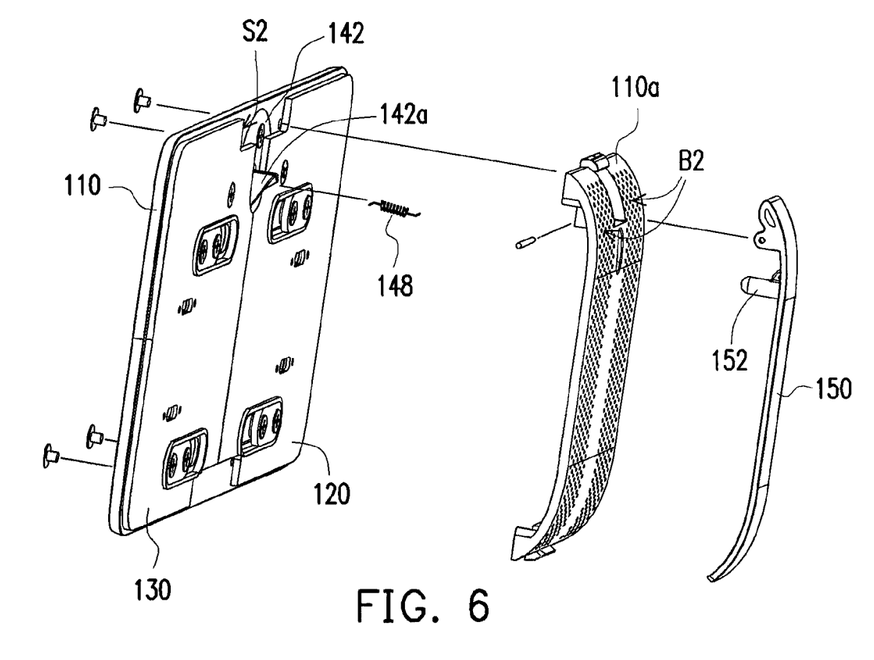
FIG. 6 is an assembling schematic diagram of a part of members of the handheld electronic device of FIG. 1A viewed from another viewing angle.
Figure 7:
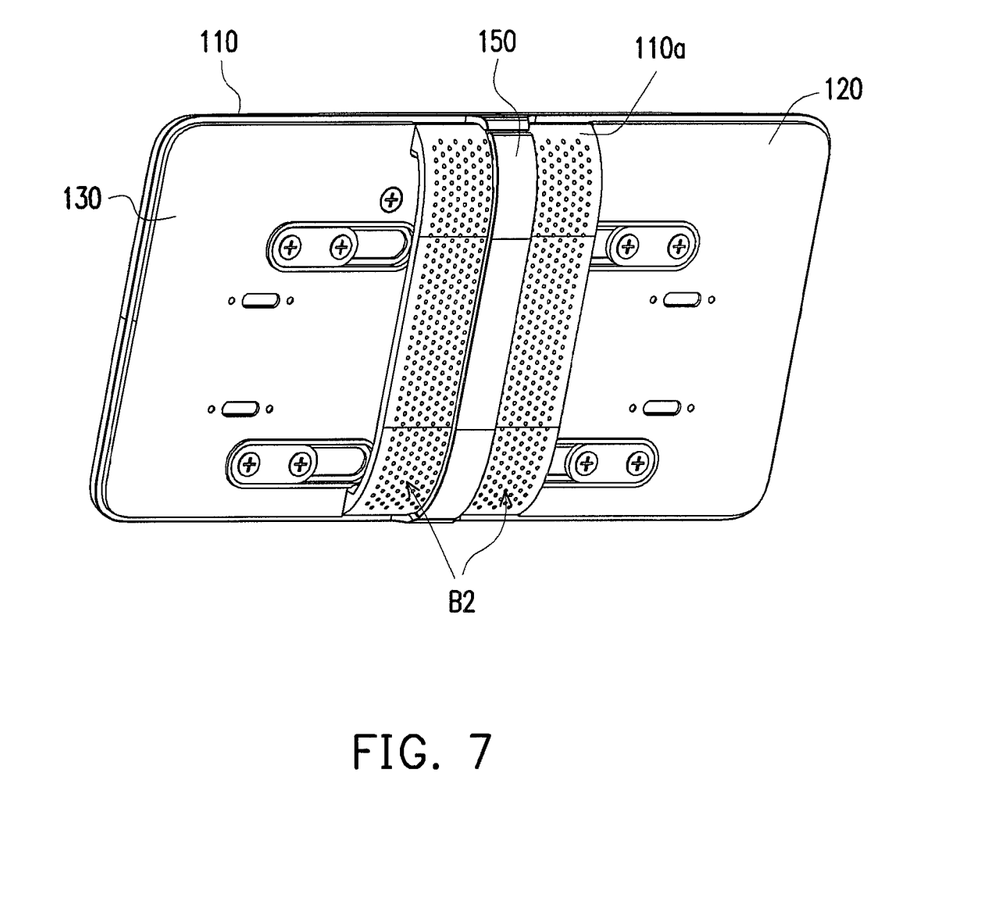
FIG. 7 is a schematic diagram of a part of members of the handheld electronic device of FIG. 6 after assembly.
Figure 8A:
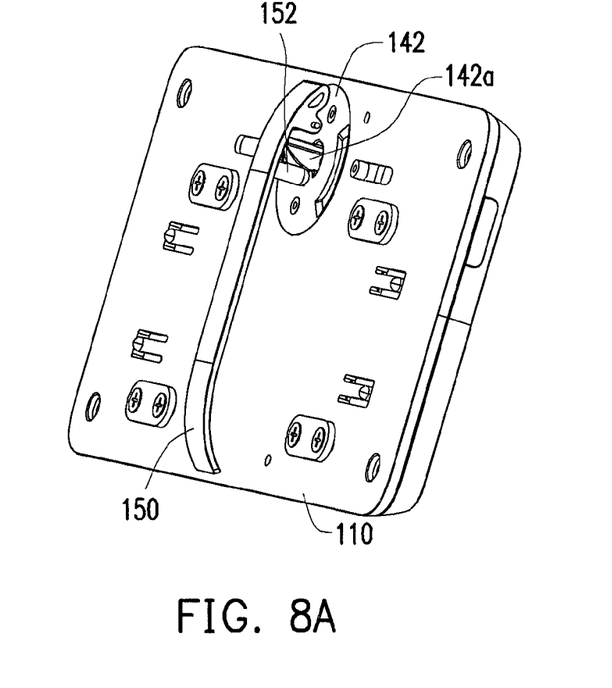
FIG. 8A and FIG. 8B are schematic diagrams respectively illustrating situations that a stand of the handheld electronic device of FIG. 6 is closed to and away from a first body.
Figure 8B:
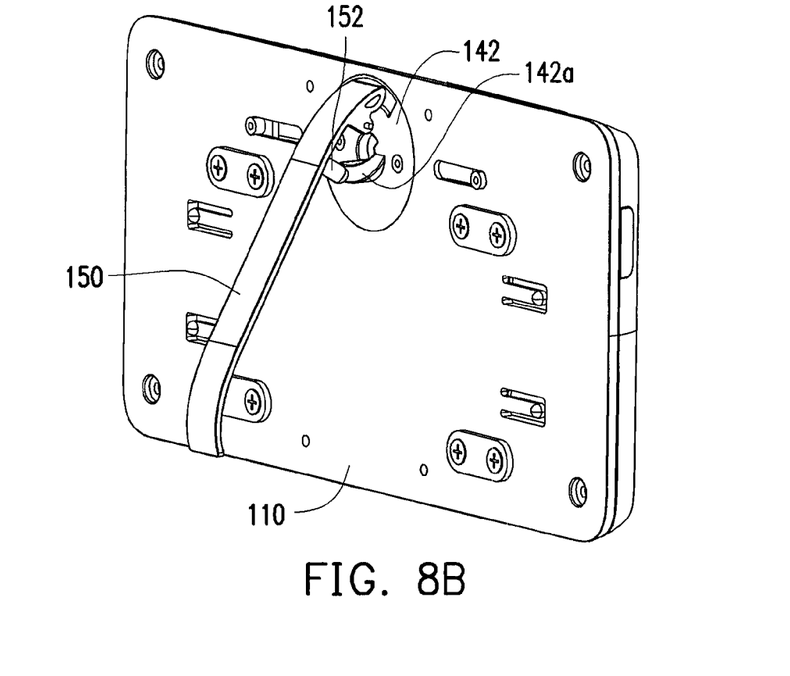

FIG. 6 is an assembling schematic diagram of a part of members of the handheld electronic device of FIG. 1A viewed from another viewing angle. FIG. 7 is a schematic diagram of a part of members of the handheld electronic device of FIG. 6 after assembly. FIG. 8A and FIG. 8B are schematic diagrams respectively illustrating situations that the stand of the handheld electronic device of FIG. 6 is closed to and away from the first body, and in FIG. 8A and FIG. 8B, a back housing 110a, the second body 120 and the third body 130 are omitted to clearly present a motion state of the stand 150. Referring to FIG. 6, FIG. 8A and FIG. 8B, in the present embodiment, the first body 110 includes the back housing 110a, which is fastened to the first body 110, and the stand 150 is pivoted to the back housing 110a so as to be pivoted to the first body 110. The turntable 142 has a push portion 142a facing to the stand 150, and the stand 150 has a protrusion 152 facing to the turntable 142. When the turntable 142 is pivotally rotated relative to the first body 110, the push portion 142a pushes the protrusion 152 to push the stand 150 away from the first body 110, so that the spread stand 150 can serve as a supporting structure of the handheld electronic device 100, as that shown in FIG. 2B and FIG. 8B.

Referring to FIG. 6 and FIG. 7, the transmission module 140 further includes a restoration member 148, for example, a spring. The restoration member 148 is connected between the first body 110 and the stand 150. When the turntable 142 is pivotally rotated relative to the first body 110 so that the push portion 142a does not push the stand 150 away from the first body 110, the restoration member 148 draws back the stand 150 to the first body 110 from the spread state shown in FIG. 2B through its elastic force, as that shown in FIG. 7 and FIG. 8A.

Referring to FIG. 1A to FIG. 2B, based on motions of the transmission module 140, the handheld electronic device 100 may have different utilization states. In detail, when the second body 120 and the third body 130 are in the close state relative to the first body 110 as that shown in FIG. 1B, orthogonal projections of the second body 120 and the third body 130 on the first body 110 have a profile complied with that of the first body 110, and the second body 120, the third body 130 and the stand 150 also have a consistent profile. Now, the stand 150 is accommodated between the second body 120 and the third body 130. In this case, the handheld electronic device 100 has a better portability.

Moreover, the first body 110 has a display region A, which is located on a first surface S1 of the first body 110 back to the second body 120 and the third body 130, as that shown in FIG. 2A. The second body 120 and the third body 130 respectively have a first speaker region B1 as that shown in FIG. 2A, and the first body 110 has a second speaker region B2, which is located on a second surface S2 of the first body 110 back to the display region A as that shown in FIG. 2B.

When the second body 120 and the third body 130 are in the close state relative to the first body 110, the first speaker regions B1 are shielded by the first body 110, and the second speaker region B2 is shielded by the second body 120 and the third body 130 as that shown in FIG. 1A and FIG. 1B. Conversely, when the second body 120 and the third body 130 are in the spread state relative to the first body 110, the first speaker regions B1 are substantially exposed outside the first body 110, and are located at two opposite sides of the display region A as that shown in FIG. 2A, and the second speaker region B2 is exposed outside the second body 120 and the third body 130 as that shown in FIG. 2B.

When the second body 120 and the third body 130 are in the spread state relative to the first body 110, and the stand 150 is also in the spread state relative to the first body 110, the first body 110 can be stood on a surface through the stand 150 spread from the first body 110 as that shown in FIG. 2A and FIG. 2B. In this case, a user can view images displayed by the display region A, and hear sounds sent by the first speaker regions B1 and the second speaker region B2.

On the other hand, referring to FIG. 4, in the present embodiment, the push portion 142a is substantially a wedge in a curved shape located on a surface of the turntable 142, i.e. a height from a top surface 142b of the push portion 142a to the surface of the turntable 142 is varied along with its curved path. In this way, a distance that the push portion 142a pushes the protrusion 152 (FIG. 6) away from the first body 110 is varied along with rotation of the turntable 142, so that an angle between the stand 150 and the first body 110 is accordingly varied.

In summary, in the application, the stand is pivoted to the first body, and the transmission module is used to drive the stand, so that the stand is opened and closed relative to the first body. In this way, the handheld electronic device can be stood on the surface, so that a utilization convenience of the handheld electronic device is increased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A handheld electronic device, comprising:
a first body;
a second body, slidably connected to the first body;
a stand, pivoted to the first body;
a transmission module, connected between the first body and the second body, wherein when the second body slides relative to the first body, the second body drives the transmission module to move the stand, so that the stand is opened and closed relative to the first body; and
a third body, slidably connected to the first body, wherein when the second body slides relative to the first body, the second body drives the transmission module to move the third body sliding relative to the first body and the second body in an opposite direction, so that the second body and the third body are switched between a close state and a spread state relative to the first body.

2. The handheld electronic device as claimed in claim 1, wherein when the second body and the third body are in the close state relative to the first body, orthogonal projections of the second body and the third body on the first body have a profile complied with that of the first body.

3. The handheld electronic device as claimed in claim 1, wherein when the second body and the third body are in the close state relative to the first body, the stand is closed to the first body, and the second body, the third body and the stand have a consistent profile.

4. The handheld electronic device as claimed in claim 1, wherein the first body has a display region located on a first surface of the first body back to the second body and the third body, and the second body and the third body respectively have a first speaker region, when the second body and the third body are in the close state relative to the first body, the first speaker regions are shielded by the first body, and when the second body and the third body are in the spread state relative to the first body, the first speaker regions are substantially exposed outside the first body, and are located at two opposite sides of the display region.

5. The handheld electronic device as claimed in claim 1, wherein the first body has a second speaker region located on a second surface of the first body back to the display region, when the second body and the third body are in the close state relative to the first body, the second speaker region is shielded by the second body and the third body, and when the second body and the third body are in the spread state relative to the first body, the second speaker region is exposed outside the second body and the third body.

6. The handheld electronic device as claimed in claim 1, wherein the second body has a guiding slot, the first body has a guiding member, and the guiding member is coupled in the guiding slot, so that the second body is capable of sliding relative to the first body.

7. The handheld electronic device as claimed in claim 1, wherein the first body has a sliding slot, and the transmission module comprises:
a turntable, pivoted to the first body; and
a connection rod, having a first end and a second end, the first end being pivoted to the turntable, and the second end passing through the sliding slot and being pivoted to the second body, wherein when the second body slides relative to the first body, the second body drives the second end of the connection rod to slide in the sliding slot, so as to drive the first end of the connection rod to move the turntable, so that the turntable is pivotally rotated relative to the first body.

8. The handheld electronic device as claimed in claim 7, wherein the transmission module further comprises:
a position-limit member, wherein the first body has a position-limit slot, the position-limit member is movably disposed in the position-limit slot, and the second end of the connection rod passes through the position-limit member and is pivoted to the second body.

9. The handheld electronic device as claimed in claim 7, wherein the turntable has a push portion facing to the stand, and the stand has a protrusion facing to the turntable, when the turntable is pivotally rotated relative to the first body, the push portion pushes the protrusion to push the stand away from the first body.

10. The handheld electronic device as claimed in claim 9, wherein an angle formed when the push portion pushes the protrusion away from the first body is varied along with rotation of the turntable.

11. The handheld electronic device as claimed in claim 9, wherein the transmission module further comprises:
a restoration member, connected between the first body and the stand, wherein when the turntable is pivotally rotated relative to the first body so that the push portion does not push the stand away from the first body, the restoration member drives the stand to be close to the first body.

* * * * *